United States Patent
Tran et al.

(10) Patent No.: US 6,182,018 B1
(45) Date of Patent: Jan. 30, 2001

(54) METHOD AND APPARATUS FOR IDENTIFYING SOUND IN A COMPOSITE SOUND SIGNAL

(75) Inventors: Vy Tran, Canton; Sheau-Fang Lei, Farmington Hills; Keng D. Hsueh, West Bloomfield; Francois Charette, Canton, all of MI (US)

(73) Assignee: Ford Global Technologies, Inc., Dearborn, MI (US)

(*) Notice: Under 35 U.S.C. 154(b), the term of this patent shall be extended for 0 days.

(21) Appl. No.: 09/140,071

(22) Filed: Aug. 25, 1998

(51) Int. Cl.[7] ............................. G01R 13/00; G06F 19/00
(52) U.S. Cl. ........................ 702/66; 702/57; 702/189; 73/602; 324/76.12
(58) Field of Search .................................. 702/66, 70, 71, 702/73, 57, 191, 112, 124, 189, 190; 73/584, 602; 706/20, 22; 324/76.11, 76.12

(56) References Cited

U.S. PATENT DOCUMENTS 5,461,655  10/1995  Vuylsteke et al. .
5,497,777  3/1996   Abdel-Malek et al. .
5,619,998  4/1997   Abdel-Malek et al. .

OTHER PUBLICATIONS

S. Lei, Wavelet Transform and Frequency Domain Kurtosis: Application To Assessment Of Hearing Hazard From Noise Exposure, 1995 IEEE ASSP Workshop on Applications Of Signal Processing To Audio And Acoustics.

A. Graps, An Introduction To Wavelets, IEEE Computational Science & Engineering, Summer, 1995, pp. 50–61.

*Primary Examiner*—Marc S. Hoff
*Assistant Examiner*—Hien Vo
(74) *Attorney, Agent, or Firm*—Mark L. Mollon

(57) ABSTRACT

Impulsive sound components in a composite sound signal are separated using wavelet analysis and sorting of wavelet coefficient sets according to statistical parameters of each respective coefficient set. Each entire coefficient set is either included or excluded from each respective separated component based on the statistical parameter. Once the impulsive sound component is isolated, it is compared with reference sound information in order to classify the sound according to its potential causes.

14 Claims, 5 Drawing Sheets

US 6,182,018 B1

METHOD AND APPARATUS FOR IDENTIFYING SOUND IN A COMPOSITE SOUND SIGNAL

BACKGROUND OF THE INVENTION

This application is related to commonly owned, copending U.S. application Ser. No. 09/140,072, entitled "Method and Apparatus for Separation of Impulsive and Non-Impulsive Components in a Signal", which was filed concurrently herewith.

The present invention relates in general to separating an impulsive sound component from a composite sound signal and then classifying the sound according to its possible source or potential cause, and more specifically to using wavelet transforms and sorting of wavelet coefficient sets to separate the impulsive component and comparing the impulsive component with previously collected reference signals.

Time-domain signals or waveforms may often include impulsive and non-impulsive components even though only one of these components may be of interest. For example, in either wireless or wired transmission of electrical or electromagnetic signals, interfering signals and background noise contaminate the signal as it travels through the wireless or wired transmission channel. The transmitted signal contains information, and therefore has primarily an impulsive character. The interference and background noise tends to be random and broadband, and therefore has primarily a non-impulsive character. After transmission, it would be desirable to separate the components so that the additive noise can be removed.

In other applications, sound waves may be converted to electrical signals for transmission or for the purpose of analyzing the sound to determine conditions that created the sound. If the sound is a voice intended for transmission, the picked-up sound may include an impulsive voice component and a non-impulsive background noise component. If the picked-up sound is created by operation of a machine or other environmental noise, the nature of the impulsive and/or non-impulsive sound components can be analyzed to identify specific noise sources or to diagnose or troubleshoot fault conditions of the machine, for example.

Prior art attempts to reduce unwanted noise and interference most often treat a signal as though the impulsive and non-impulsive components occupy different frequency bands. Thus, lowpass, highpass, and bandpass filtering have been used to try to remove an undesired component. However, significant portions of the components often share the same frequencies. Furthermore, these frequency bands of interest are not known or easily determined. Therefore, frequency filtering is unable to separate the components sufficiently for many purposes. Fourier analysis and various Fourier-based frequency-domain techniques have also been used in attempts to reduce undesired noise components, but these techniques also cannot separate components which share the same frequencies.

More recently, wavelet analysis has been used to de-noise signals. Wavelet transforms are similar in some ways to Fourier transforms, but differ in that the signal decomposition is done using a wavelet basis function over the plurality of time-versus-frequency spans, each span having a different scale. In a discrete wavelet transform, the decomposed input signal is represented by a plurality of wavelet coefficient sets, each set corresponding to a respective time-versus-frequency span. De-noising signals using wavelet analysis has been done in the prior art by adjusting the wavelet coefficient sets by thresholding and shrinking the wavelet coefficients prior to recovering a time-domain signal via an inverse wavelet transform. However, this technique has not resulted in the desired signals being separated to the degree necessary for many applications.

When attempting to identify the source of a sound, such as when diagnosing operation of a machine or detecting a potential cause of an unwanted noise, the accuracy of identification depends upon how well the sound is separated from other components of the composite sound. For example, in finding and fixing squeak and rattle problems when servicing or developing automotive vehicles, an impulsive sound created by some imperfection in the vehicle must be classified according to its probable cause while in the presence of background noises. Inadequate suppression of these background noises may prevent easy classification of the impulsive sound, especially when trying to automate the identification.

SUMMARY OF THE INVENTION

The present invention has the advantage of accurately identifying a source of sound in a composite sound signal.

In one aspect of the invention, a method of identifying a sound in a composite sound signal includes converting the composite sound signal to an electrical signal. The electrical signal is decomposed using a wavelet transform to produce a plurality of sets of wavelet coefficients, each set of wavelet coefficients corresponding to a respective time-versus-frequency span. A respective statistical parameter is determined for each set of wavelet coefficients. An impulsive signal is re-synthesized using an inverse wavelet transform applied to selected ones of the sets of wavelet coefficients, the selected ones being selected in response to the respective statistical parameters. The impulsive signal is compared with a plurality of reference signals to classify the sound with respect to the reference signals.

DETAILED DESCRIPTION OF PREFERRED EMBODIMENTS

Figure 1:
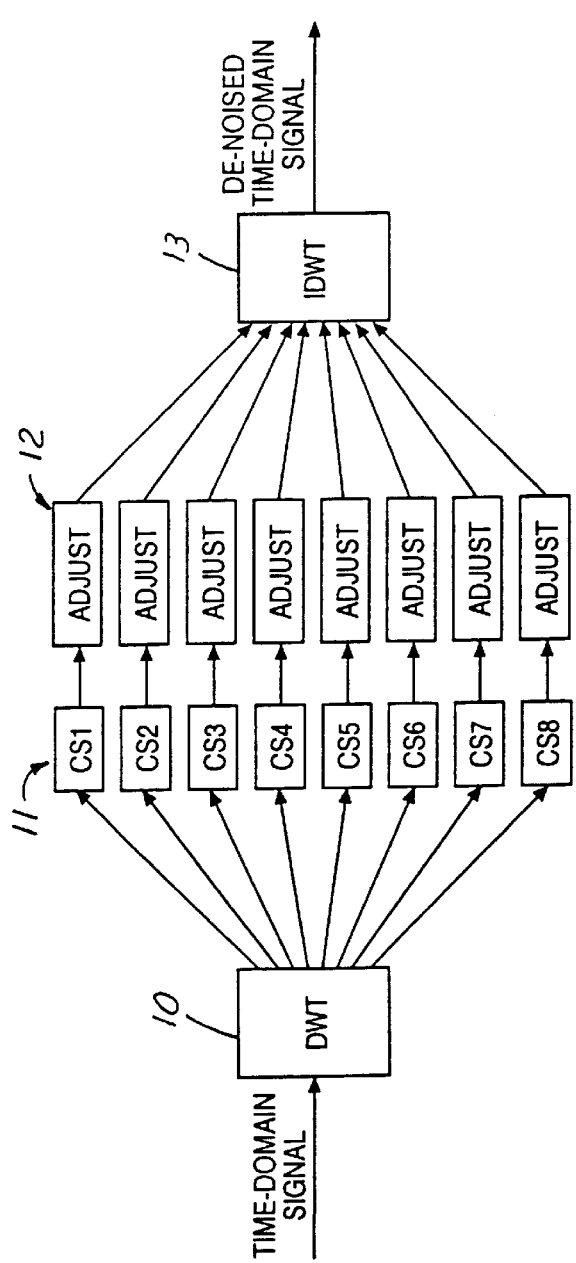
FIG. 1 is a functional block diagram showing a de-noising process of the prior art.

Wavelet analysis has been used in the past to remove noise from data using a technique called wavelet shrinkage and thresholding. A wavelet transform decomposes a signal into wavelet coefficients, some of which correspond to fine details of the input signal and others of which correspond to gross approximations of the input signal. Wavelet shrinkage and thresholding resets all coefficients to zero which have a value less than a threshold. This reduces the fine details which is where certain noise components may be represented. Thereafter, the modified coefficients are applied to an inverse transform to reproduce the input signal with some fine details missing, and therefore with a reduced noise level. As shown in FIG. 1, a time-domain signal is applied to a discrete wavelet transform (DWT) 10. As a result of the decomposition, a plurality of wavelet coefficient sets 11, individually designated as CS1 through CS8, are produced. Each coefficient set corresponds to a respective time-versus-frequency span and has a plurality of datapoint samples. The number and locations of the time-versus-frequency spans are selected to maximize performance in any particular application. Typically, the range between an upper and a lower frequency is divided geometrically (e.g., logarithmically) into the desired number of time-versus-frequency spans. The plurality of coefficient sets 11 are each adjusted according to the thresholding criteria of the wavelet shrinkage and thresholding technique in a plurality of adjustment blocks 12. The adjusted coefficient sets are provided to an inverse discrete wavelet transform (IDWT) 13 which reproduces a de-noised time-domain signal.

Figure 2:
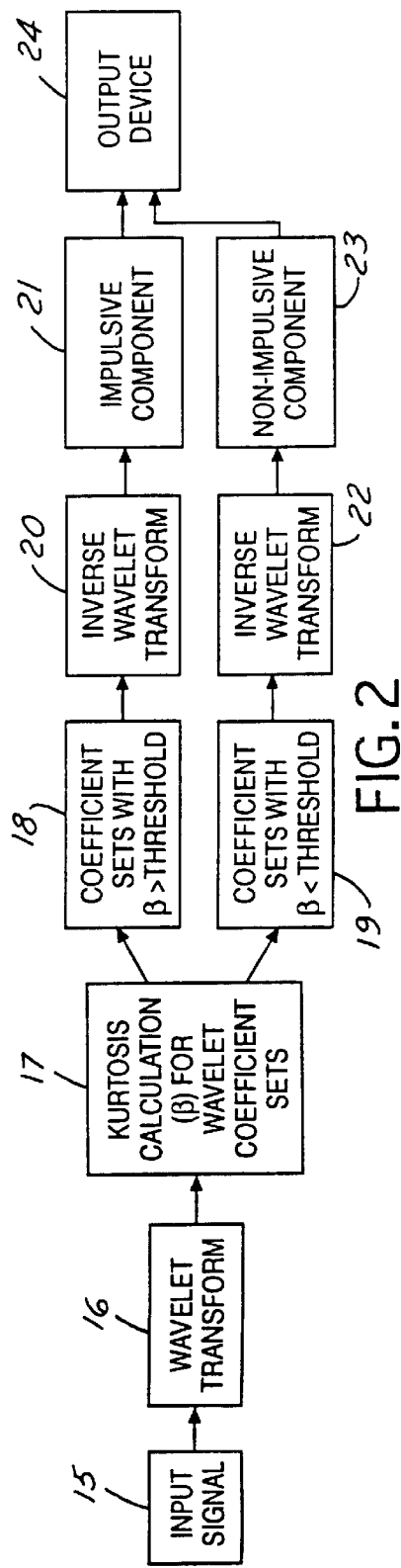
FIG. 2 is a functional block diagram showing an improved signal separation process of the present invention.

While the technique of FIG. 1 can be effective in reducing gaussian-type noise in a noisy data signal, the degree of signal separation obtained in certain applications (such as clearly separating impulsive and non-impulsive, non-gaussian components) is not fully achieved. Such signal separation is greatly improved using the present invention as shown generally in FIG. 2. A time-domain input signal 15 is input to a wavelet transform 16. A plurality of resulting wavelet coefficient sets are input to a kurtosis calculation 17. A kurtosis value $\beta$ is determined for each of the wavelet coefficient sets according to the ratio of the fourth-order central moment to the squared second-order central moment of the individual coefficient values within each wavelet coefficient set. Each coefficient set has about the same number of datapoints as input signal 15. Each wavelet coefficient set corresponds to a different level or scale of the wavelet transform. Rather than modify values within each respective wavelet coefficient set as in the prior art, the present invention sorts the wavelet coefficient sets according to the respective kurtosis values or with respect to some other statistical parameter. Based upon this sorting of coefficient sets, the respective impulsive and non-impulsive components of the input signal are separated.

Thus, the wavelet coefficient sets are sorted into coefficient sets 18 having kurtosis values $\beta$ greater than a predetermined kurtosis threshold and coefficient sets 19 having kurtosis values $\beta$ less than the predetermined kurtosis threshold. Coefficient sets 18 are passed through an inverse wavelet transform 20 to reproduce the impulsive component 21. Coefficient sets 19 are passed through an inverse wavelet transform 22 to produce the non-impulsive component 23. Either or both of these signal components are coupled to an output device 24 which may include an audio transducer or a video display for reproducing audio and video signals, for example.

The kurtosis value is a preferred statistical parameter for separating the impulsive and non-impulsive components. However, other statistical parameters can be used such as mean, standard deviation, skewness, and variance. Furthermore, the threshold employed for separating the signal components may take on different values depending upon the signal sources. In general, a kurtosis threshold equal to about 5 provides good results.

Figure 3:
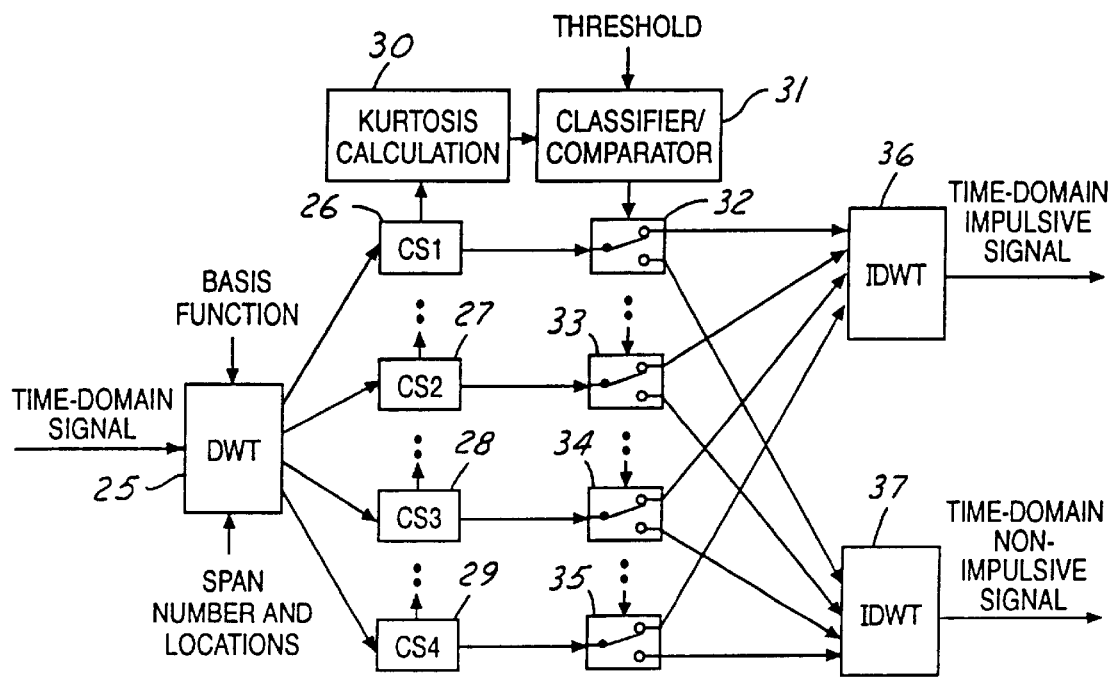
FIG. 3 is a block diagram showing an implementation of the present invention in greater detail.

A specific implementation of the present invention is shown in greater detail in FIG. 3. A time-domain signal having impulsive and non-impulsive components which are desired to be separated is input to a discrete wavelet transform (DWT) 25. A conventional DWT is employed. A selected basis function and the number of spans and locations for each time-versus-frequency span must be specified as is known in the art. A plurality of sets of wavelet coefficients CS1 through CS4 are generated in blocks 26–29. Typically, the number of time-versus-frequency spans is greater than four, but four are shown to simplify the drawing. In many applications, a span number of eight has been found to provide good performance.

CS1 block 26 is coupled to a kurtosis calculation block 30. The kurtosis value from kurtosis calculation block 30 is provided to a classifier/comparator 31. A predetermined threshold is also provided to classifier/comparator 31 and is compared with the kurtosis value. Depending upon the result of the comparison, classifier/comparator 31 controls a multiplex switch 32. The input of multiplex switch 32 receives coefficient set CS1. The switch output may be switched to either an impulsive IDWT 36 or a non-impulsive IDWT 37. Coefficient blocks 27–29 and multiplex switches 33–35 are each connected to respective identical kurtosis calculation blocks and classifier/comparator blocks (not shown). Thus, coefficient sets having a kurtosis value greater than the threshold are provided through their respective multiplex switches to the impulsive IDWT, thereby producing a time-domain impulsive signal. Coefficient sets having a kurtosis value less than the threshold are switched to non-impulsive IDWT 37 to produce a time-domain non-impulsive signal.

Figure 4:
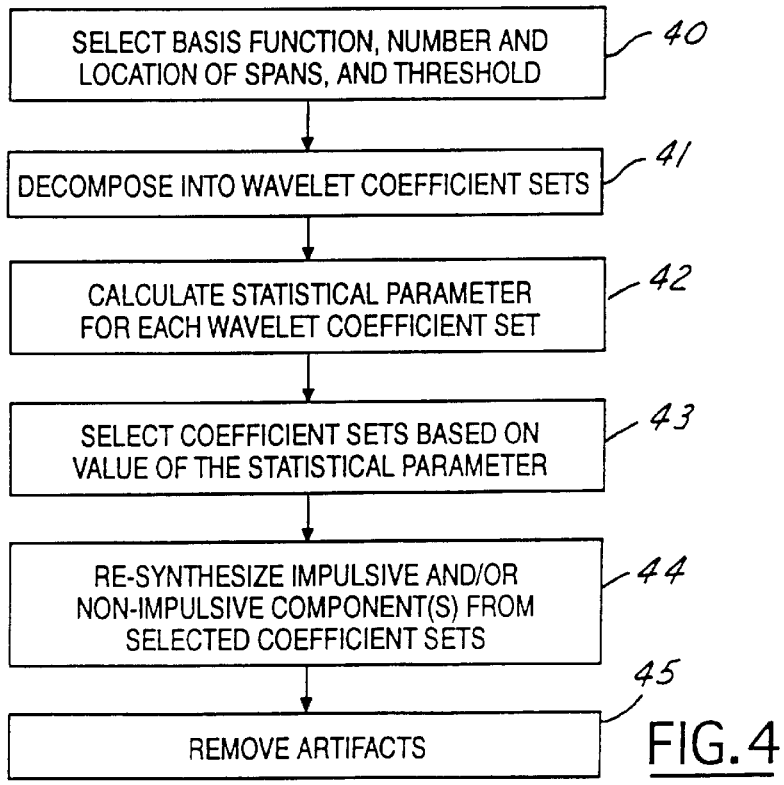
FIG. 4 is a flowchart showing a preferred method of the present invention.

A preferred embodiment of a method according to the present invention is shown in FIG. 4. In step 40, a basis function, the number and location of time-versus-frequency spans, and a predetermined threshold are selected for a particular application of impulsive and non-impulsive signal separation. One example of an appropriate basis function may be the Debauchies 40 basis function. A preferred number of time-versus-frequency spans is about eight, with the spans covering frequencies from zero to 22 kHz (using a common sampling rate of 44 kHz for audio signals). The spans are arranged geometrically and do not cover equal frequency ranges. For example, a first span may cover from 11 kHz to 22 kHz. A second span covers from 5.5 kHz to 11 kHz, and so on. A preferred value for a kurtosis threshold may be equal to about five.

In step 41, the input signal data is decomposed into the wavelet coefficient sets. A statistical parameter is calculated in step 42 for each respective wavelet coefficient set. In a preferred embodiment, the standard mathematical function of calculating a kurtosis value is employed using the individual coefficient values within a wavelet coefficient sets as inputs to the calculation. The output of the calculation is a single kurtosis value for the coefficient set. In step 43, wavelet coefficient sets are selected or sorted based on their respective values of the statistical parameter. The preferred embodiment is comprised of selecting the ones of the sets of wavelet coefficients which all have a kurtosis value either greater than or less than the kurtosis threshold, depending upon whether the impulsive or non-impulsive component is desired for reconstruction. In step 44, that component, or both, are re-synthesized from the selected coefficient sets by applying the selected coefficient sets to an inverse wavelet transform. In other words, all the wavelet coefficients within wavelet coefficient sets not to be included in a particular inverse transform are set to zero.

After re-synthesis, signal artifacts may have been introduced since the inverse wavelet transform is processed with truncated (i.e., set to zero) data. A typical artifact is an erroneously increased output value at either end of the time-domain signal. Thus, in step 45 artifacts are removed by throwing away the endpoint samples in the re-synthesized time-domain signal.

Figure 5:
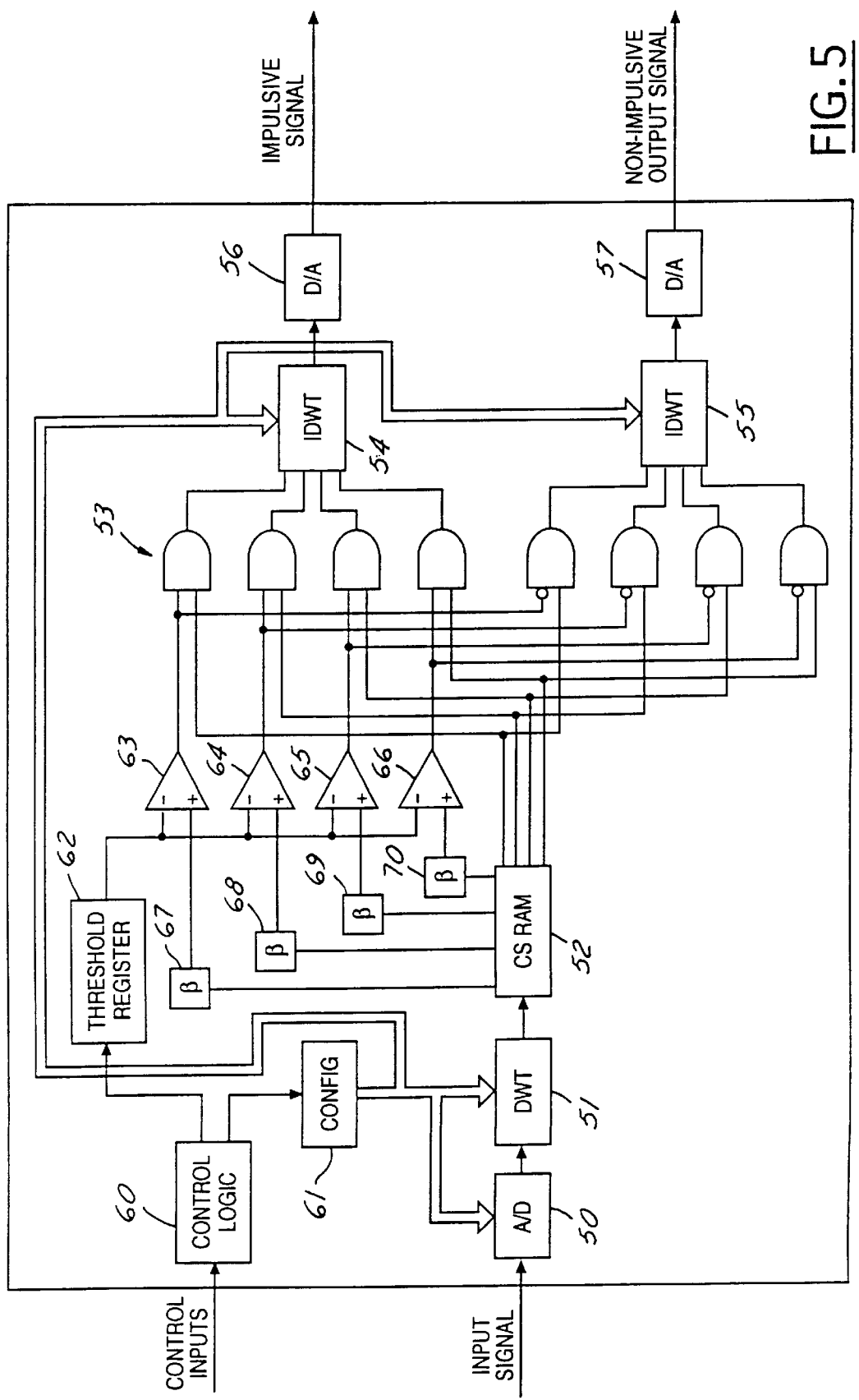
FIG. 5 is a schematic block diagram showing customized hardware for implementing the present invention.

The present invention may preferably be implemented using digital signal processing (DSP) programmable general purpose processors or specially designed application specific integrated circuits (ASICs), for example. FIG. 5 shows a functional block diagram for implementation with either a general purpose DSP or an ASIC. An input signal is provided to an analog-to-digital converter 50. The input signal may be digitized at a sampling frequency $f_s$ of about 44 kHz, for example. The digitized signals are provided to a discrete wavelet transform (DWT) 51. After decomposition, DWT 51 provides a plurality of wavelet coefficient sets to a coefficient-set random access memory (CSRAM) 52. The coefficient sets from CSRAM 52 are provided to a bank of transmission gates 53 comprised of AND-gates. Each coefficient set is coupled to two transmission gates which are inversely controlled as described below. The outputs of each pair of transmission gates are respectively connected to either IDWT 54 or IDWT 55. IDWT 54 provides the impulsive output signal after passing the inverse transform signal through a digital-to-analog converter 56. The output of IDWT 55 is connected to a digital-to-analog converter 57 which provides the non-impulsive signal.

Various control inputs are provided to a control logic block 60. Through these control inputs, a user can specify various parameters for the wavelet-based signal separation including the basis wavelet function, the number and location of time-versus-frequency spans, the threshold value, and other parameters such as the sampling rate to be used. The transform-related parameters are provided to a configuration block 61 which configures DWT 51 and IDWT's 54 and 55.

Control logic 60 also provides the threshold value to a threshold register 62. The threshold value is provided from threshold register 62 to the inverting inputs of a plurality of comparators 63–66. The non-inverting inputs of comparators 63–66 receive kurtosis values β for respective coefficient sets from a plurality of kurtosis calculators 67–70, respectively. The output of each comparator controls a pair of transmission gates which correspond to the coefficient set for which the comparator also receives the respective kurtosis value. The comparator output is inverted at the input to one transmission gate so that the respective coefficient set is coupled to only one of the IDWTs 54 or 55. Thus, the impulsive and non-impulsive signal components are separated and are available at the outputs of the DSP or ASIC and may be selectively used for any desired application.

Based on the foregoing, the present invention automatically detects and separates impulsive signal components (such as static noises in communication signals or road-induced squeaks and rattles in automobiles) from non-impulsive components (such as background noise) for any types of signals using a predetermined threshold. The invention is adaptive to different types of signals and threshold levels. The invention achieves fast processing speed and may be implemented using general or customized integrated circuits. The invention may be used to identify and separate out impulsive noise signatures reflecting abnormalities of machine operations (e.g., bearing failure, quality control issues, etc.). The invention is also useful in communication, medical imaging and other applications where other impulsive noises or information need to be separated such as in the isolation of static noises, extraneous noises, vibrations or disturbances, and others.

Figure 6:
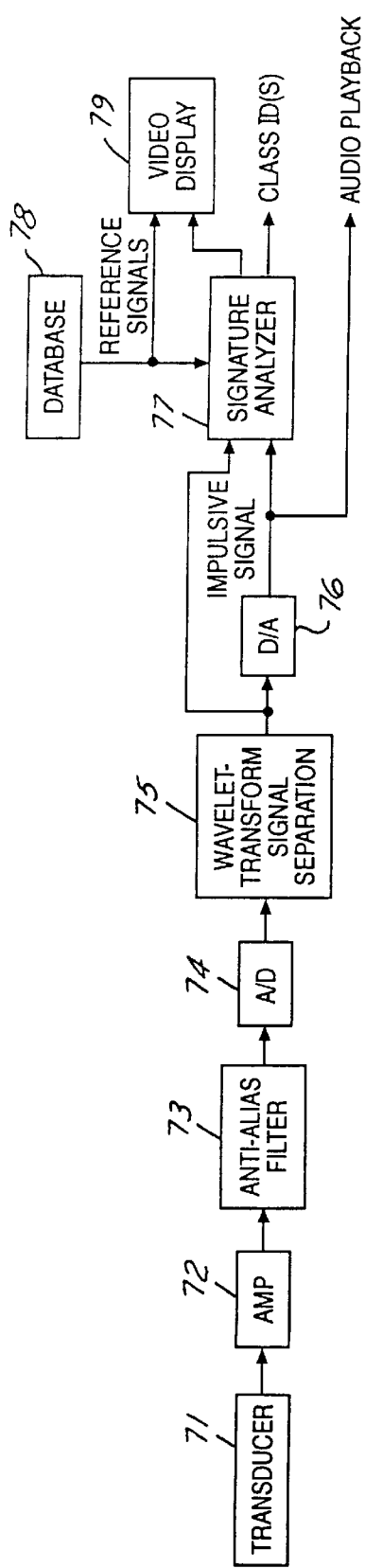
FIG. 6 is a functional block diagram of a sound identification system according to the invention.

Apparatus for separating and identifying sounds and/or potential causes of impulsive sounds is shown in FIG. 6. The apparatus may be used to identify sources of squeaks, rattles, or unexpected noises in automotive vehicles, for example. Since these undesirable noises are induced only when the vehicle is in motion, they always coexist with background noise thereby making it difficult to identify their cause without first separating the noise components.

In FIG. 6, a transducer 71 such as a microphone provides an audio signal including a composite sound signal through an amplifier 72 and an anti-aliasing filter 73 to an analog-to-digital converter 74. A digitized composite sound signal is processed by a wavelet-transform signal separation block 75 to separate out the impulsive part of the composite signal. The impulsive signal may be provided to a signal analyzer 77 directly in digital format, or may be first converted back to analog format in a digital-to-analog converter 76. The analog impulsive signal can also be made available for audio playback or recording.

Signature analyzer 77 compares the impulsive signal with a plurality of reference signals from a database 78 to classify the impulsive sound. Based upon this classification, signature analyzer 77 outputs a class identifier (ID) corresponding to the most probable cause of the sound or can also output a ranked list of several IDs in descending order of their probability of having caused the impulsive sound. Alternatively, signature analyzer 77 may extract certain features of the impulsive signal for display on a video display 79. Corresponding features of the reference signals are also displayed on video display 79 to allow a trained person to make a visual comparison and possible identification of the cause of the sound.

Figure 7:
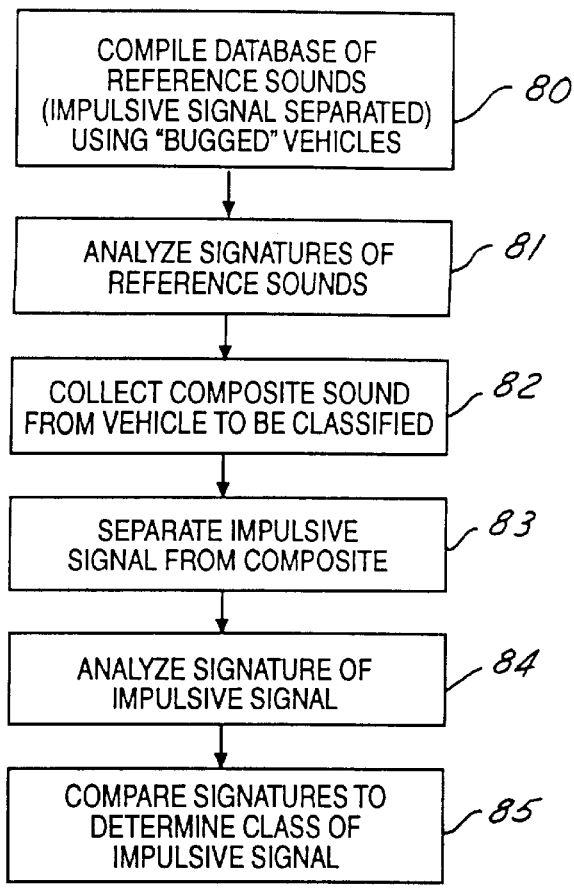
FIG. 7 is a flowchart showing a method of operating the apparatus of FIG. 6.

A preferred method for sound identification using the apparatus of FIG. 6 is shown in FIG. 7. In step 80, the database of reference sounds is compiled. To generate the database, imperfections leading to the unwanted sounds are deliberately created in test vehicles and the composite sounds are recorded. Impulsive signal separation is then employed to remove the background noise from the reference signals.

In step 81, signatures of the reference signals are calculated and analyzed. Preferred signatures include the statistical parameters of mean value or norm, standard deviation, skewness, and kurtosis value. Other known features of the waveforms may also be used to characterize the signals.

In step 82, a composite sound is collected in a vehicle having an unwanted noise which is to be isolated and classified. The impulsive signal (representing the unwanted noise) is separated in step 83. A signature or signatures of the separated impulsive signal are calculated and analyzed in step 84. The signatures are the same signatures (e.g., statistical parameters) that were obtained for the reference sounds in step 81.

In step 85, the signatures are compared to determine which class best fits the impulsive signal. For example, a reference database may include the signatures of various vehicle suspension rattles, instrument panel rattles, and package tray squeaks as reference sounds. The best match or matches between the reference signatures and the impulsive signature can be found using conventional methods, for example. Based on the identified class, a repair of the part or system causing the unwanted sound can be done.

Figure 8:
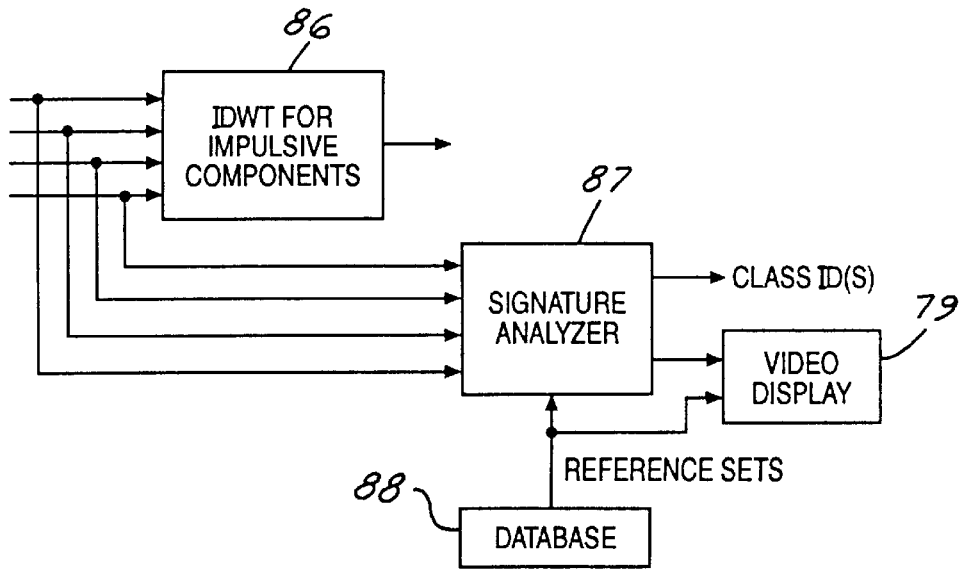
FIG. 8 is a functional block diagram of an alternative sound identification system.

An alternative embodiment is shown in FIG. 8 wherein the impulsive signal is classified in the wavelet domain. Thus, the wavelet coefficient sets that are input to IDWT 86 for the impulsive component are input to a signature analyzer 87. The statistical parameters or other signatures are calculated for the impulsive sets of coefficients. In this embodiment, database 88 includes reference sets of wavelet coefficients wherein each reference set of wavelet coefficients corresponds to a respective sound classification.

Figure 9:
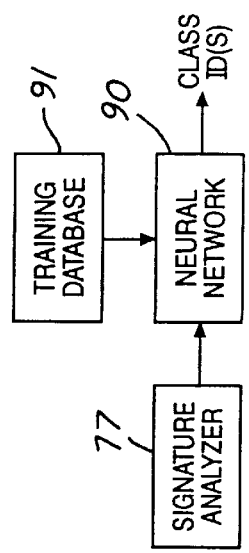
FIG. 9 is a functional block diagram showing a further embodiment using a neural network.

FIG. 9 shows a further embodiment wherein the signatures of the impulsive sound are classified using a neural network. Signature analyzer 77 provides the impulsive statistical parameters to a neural network 90 which has been previously trained to recognize the desired classifications of sounds according to a training database 91.

Figure 10:
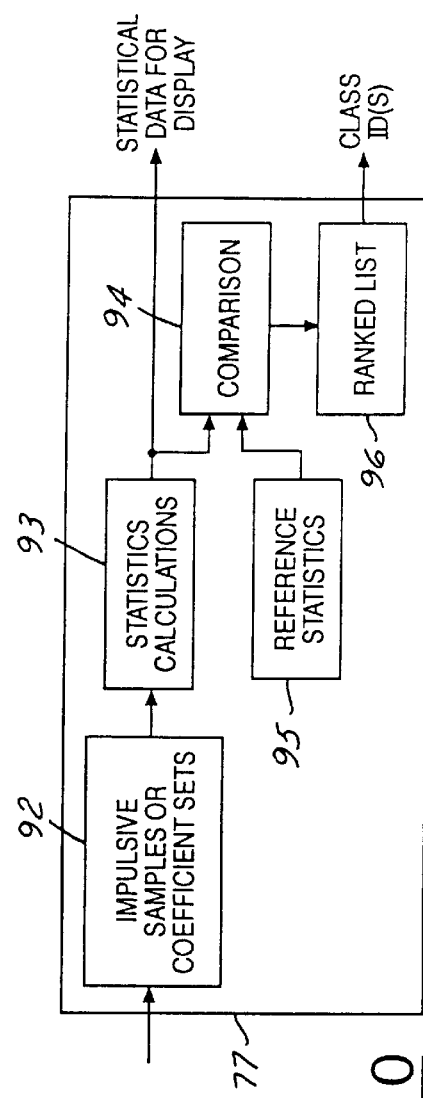
FIG. 10 is a functional block diagram showing a signature analyzer of the present invention.

Signature analyzer 77 is shown in greater detail in FIG. 10. Impulsive sound samples or the impulsive wavelet coefficient sets are received in a buffer 92. A statistics calculation block 93 determines the signatures of the impulsive sound. The statistical parameters may be sent to a display or may be compared in a comparison block 94. The statistical parameters of the reference sound classes are provided to a second input of comparison block 94 from a reference statistics buffer 95. Based on the comparison, a ranked list 96 is derived. The highest ranking class ID or a list of class IDs in ranked order is communicated to the user.

What is claimed is:

1. A method of identifying a sound in a composite sound signal, comprising the steps of:

converting said composite sound signal to an electrical signal;

decomposing said electrical signal using a wavelet transform to produce a plurality of sets of wavelet coefficients, each set of wavelet coefficients corresponding to a respective time-versus-frequency span;

determining a respective statistical parameter for each set of wavelet coefficients;

re-synthesizing an impulsive signal using an inverse wavelet transform applied to selected ones of said sets of wavelet coefficients, said selected ones being selected in response to said respective statistical parameters; and comparing said impulsive signal with a plurality of reference signals to classify said sound with respect to said reference signals.

2. The method of claim 1 wherein said plurality of reference signals includes sounds caused by squeaks and rattles in motor vehicles.

3. The method of claim 1 wherein said comparing step is comprised of signature analysis wherein similarities between said impulsive signal and each of said reference signals are ranked.

4. The method of claim 3 wherein said signature analysis is comprised of determining one or more statistical parameters of said impulsive sound and comparing said statistical parameters with corresponding statistical parameters of said reference signals.

5. The method of claim 1 wherein said comparing step is comprised of a neural network classification.

6. A method of identifying a sound in a composite sound signal, comprising the steps of:

converting said composite sound signal to an electrical signal;

decomposing said electrical signal using a wavelet transform to produce a plurality of sets of wavelet coefficients, each set of wavelet coefficients corresponding to a respective time-versus-frequency span;

determining a respective statistical parameter for each set of wavelet coefficients;

identifying selected sets of wavelet coefficients as impulsive sets in response to said respective statistical parameters; and comparing said impulsive sets with a plurality of reference sets of wavelet coefficients to classify said sound with respect to said reference sets of wavelet coefficients, wherein each reference set of wavelet coefficients corresponds to a respective sound classification.

7. The method of claim 6 wherein said plurality of reference sets of wavelet coefficients includes decompositions of sounds caused by squeaks and rattles in motor vehicles.

8. The method of claim 6 wherein said comparing step is comprised of signature analysis wherein similarities between said impulsive sets and each of said reference sets of wavelet coefficients are ranked.

9. The method of claim 8 wherein said signature analysis is comprised of determining one or more statistical parameters of said impulsive sets and comparing said statistical parameters with corresponding statistical parameters of said reference sets of wavelet coefficients.

10. The method of claim 6 wherein said comparing step is comprised of a neural network classification.

11. Apparatus for identifying a sound in a composite sound signal, comprising the steps of:

a transducer converting said composite sound signal to an electrical signal;

a wavelet transformer decomposing said electrical signal into a plurality of wavelet coefficient sets;

a statistical parameter calculator calculating a statistical parameter for each wavelet coefficient set;

a separator forming an impulsive group of wavelet coefficient sets in response to said statistical parameters;

an inverse wavelet transformer for synthesizing an impulsive signal from said impulsive group of wavelet coefficient sets; and a classifier comparing said impulsive signal with a plurality of reference signals to classify said sound with respect to said reference signals.

12. The apparatus of claim 11 wherein said classifier is comprised of a signature analyzer wherein similarities between said impulsive signal and each of said reference signals are ranked.

13. The apparatus of claim 12 wherein said signature analyzer comprises:

statistics means for determining statistical parameters of said impulsive signal; and comparing means for comparing said determined statistical parameters with statistical parameters of said reference signals.

14. The apparatus of claim 11 wherein said classifier is comprised of a neural network.

* * * * *